(No Model.)

G. H. COURSEN.
NAIL BRUSH.

No. 380,476. Patented Apr. 3, 1888.

WITNESSES:
C. Neveux
C. Sedgwick

INVENTOR:
G. H. Coursen
BY Munn & Co
ATTORNEYS.

UNITED STATES PATENT OFFICE.

GEORGE HAMPTON COURSEN, OF BALTIMORE, MARYLAND.

NAIL-BRUSH.

SPECIFICATION forming part of Letters Patent No. 380,476, dated April 3, 1888.

Application filed November 11, 1887. Serial No. 254,885. (No model.)

*To all whom it may concern:*

Be it known that I, GEORGE HAMPTON COURSEN, of the city of Baltimore, in the State of Maryland, have invented certain new and useful Improvements in Nail-Brushes, of which the following is a full, clear, and exact description.

It has been usual to construct nail-brushes with pointed projections or horns on the rear end of the handle for working under or cleaning the nails, in addition to the usual operation of cleaning them with the bristle portion of the brush. These projections or horns have usually been on opposite sides of the end of the handle and of a curved hook form, with their points facing each other.

My invention consists in providing the rear end of the handle of the nail-brush with a central nail-cleaner or nail-cleaning projection and guards on opposite sides thereof, but separated therefrom and constructed to protect the nail-cleaner from injury by contact with extraneous surfaces or bodies; also whereby a more efficient shape may be given to the nail-cleaner, substantially as hereinafter described, and pointed out in the claim.

Reference is to be had to the accompanying drawings, forming a part of this specification, in which similar letters of reference indicate corresponding parts in all the figures.

Figure 1:
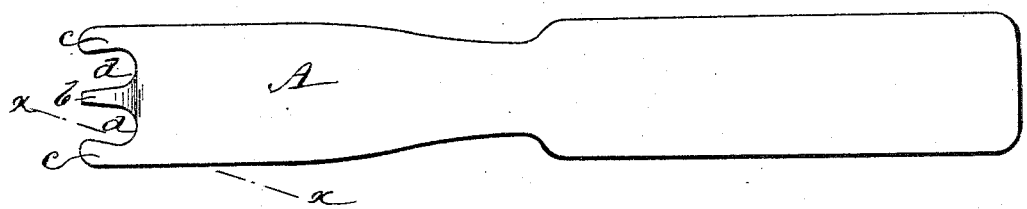
Figure 2:
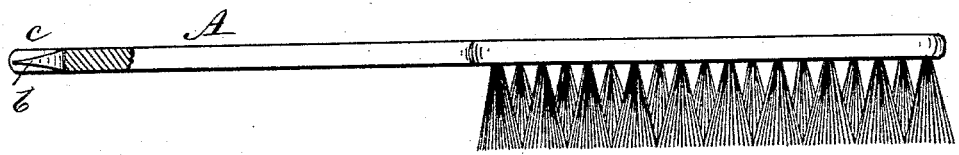
Figure 3:
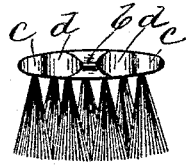

Figure 1 represents a back view of a nail-brush with the improvement applied to its handle. Fig. 2 is a partly-sectional side view of the same, the section being taken upon the line $x\ x$ in Fig. 1; and Fig. 3 is a rear end view of the brush.

A is the handle of the brush, made of any suitable material and of any desired shape in its general configuration.

The nail-cleaner is indicated by the letter $b$, and is formed by a projection on the rear end of the handle centrally or intermediately of its width. On opposite sides of this nail-cleaner $b$ the rear end of the handle is further constructed or provided with guards $c\ c$. These side guards are made to leave spaces $d\ d$ between them and the nail-cleaner $b$, and are constructed to project slightly beyond the front or working end of the nail-cleaner, also are of such a thickness and shape that they project beyond the nail-cleaner $b$ in direction of its thickness, especially toward its sharp or working outer end. This construction secures the nail-cleaner $b$ from coming in contact with any outside hard flat surface or body, no matter in what position the end of the handle is placed, whether endwise, flatwise, or otherwise, and thus said nail-cleaner is protected from being blunted or broken off. Said construction also provides for making the nail-cleaner $b$ of a chisel shape, or straight and flat, with square edges at its outer end, without making a dangerous exposure of the same.

Having thus described my invention, I claim as new and desire to secure by Letters Patent—

In nail-brushes, the handle of the brush, provided at its rear end intermediately of its width with a projecting nail-cleaner, and with protecting-guards for said cleaner, also arranged to project from the rear end of the handle on opposite sides of the cleaner, and with intervening spaces between them and the cleaner, substantially as specified.

GEORGE HAMPTON COURSEN.

Witnesses:
C. CARROLL POULTNEY,
W. S. WILKINSON.